April 24, 1951   J. C. MILLS   2,550,077
PICKLING OR LIQUOR-PROCESSING ARTICLES
Filed April 30, 1948   4 Sheets-Sheet 2

April 24, 1951 J. C. MILLS 2,550,077
PICKLING OR LIQUOR-PROCESSING ARTICLES
Filed April 30, 1948 4 Sheets-Sheet 3

INVENTOR
J. C. MILLS

BY A. Yates Dowell
ATTORNEY

April 24, 1951  J. C. MILLS  2,550,077
PICKLING OR LIQUOR-PROCESSING ARTICLES
Filed April 30, 1948  4 Sheets-Sheet 4

INVENTOR
J. C. MILLS

BY A. Yates Dowell
ATTORNEY

Patented Apr. 24, 1951

2,550,077

UNITED STATES PATENT OFFICE 2,550,077

PICKLING OR LIQUOR-PROCESSING ARTICLES

John C. Mills, Wolverhampton, England

Application April 30, 1948, Serial No. 24,389
In Great Britain May 8, 1947

7 Claims. (Cl. 51—164)

This invention relates to means for use in pickling or liquor-processing articles, such, for instance, as before coating them with metal; or for cleansing or coating metal or non-metallic articles, and has for its object to provide an improved form of such means.

According to the invention the material to be processed is placed in a basket, conveniently of cylindrical form, and adapted to be rotated about a horizontal axis in bearings of a frame or casing, and beneath the basket there is placed a container for liquid for pickling or otherwise processing the articles. The container is open at the top and is mounted in such manner that it can be raised and lowered. When in its upmost position it envelopes the said basket, the liquid in the container then having access to the articles in the basket.

At one side of the container is a balance weight for balancing the container the said balance weight being preferably a tank containing water. The balance weight or tank and the said container are suspended from a flexible connector which passes over one or more overhead pulleys. Thus, as the balance weight or tank moves down, the container moves up. One of the overhead pulleys may be controlled by escapement gear to limit its rate of turning. Alternatively such control may be by power drive which will also act as holding means at the end of the travel.

If the balance weight is a water tank, its lowest level should be mainly above the top of the container at its highest level, the water tank being connected with the container by a flexible pipe so that, after the processing of the material, and after the processing liquid has been run out from the container, water from the water tank can be run into the container by the said pipe to rinse the material therein, after which the water can be run out from the container when in its lowest position by a suitable cock; and the tank and the container refilled. The pipe from the water tank is also provided with a cock.

At one side of the basket and container, and preferably beneath the said water tank, there is provided a fixed stock tank to contain the processing liquid such tank being referred to hereinafter as the liquid tank. This tank is so positioned that it is below the container when the latter is in its upmost position, and above the container when the latter is in its downmost position. The liquid tank is also connected with the container by a flexible pipe provided with a cock.

The basket may be a framework or perforated metal receptacle open at its ends to allow perforated or wire mesh receptacles to be inserted and removed.

The liquid tank may contain alkali, acid or neutral liquid and it may be heated. A stationary gas jet may be provided to heat the rotating basket when the container is in its downmost position to dry the basket and the material which it contains.

The various cocks and locking means may be operated in required order by flexible operating gear which may be electrically controlled by a continuously running drum switch, or mechanically controlled by cams and flexible gear.

An embodiment of the invention is described with reference to the accompanying drawings, of which:

Figure 1:
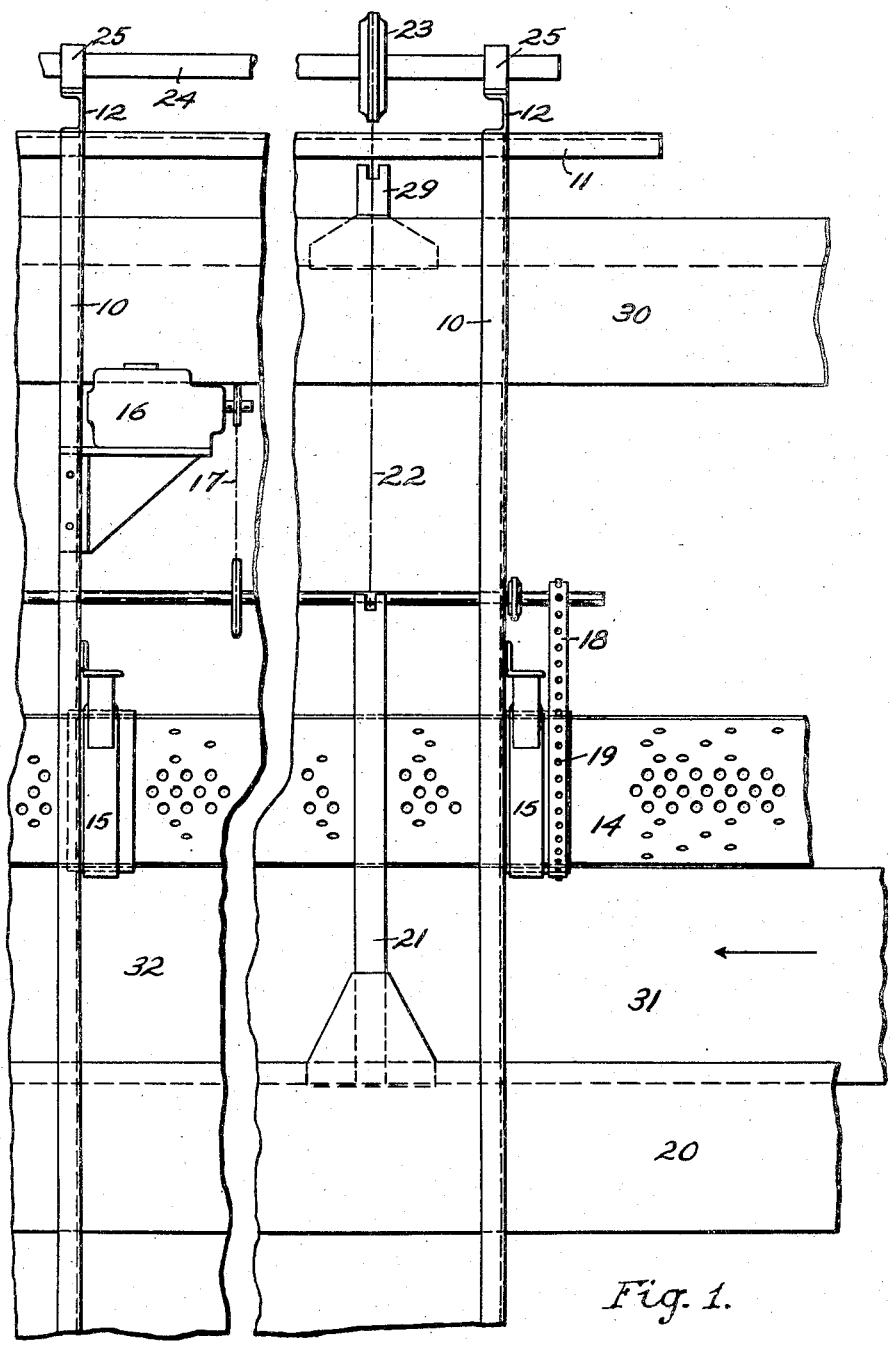
Figure 1 is a side elevation, partly broken away, illustrating a portion of a device according to the invention, the water tank being shown in its raised position and the liquid container in its lowered position.
Figure 2:
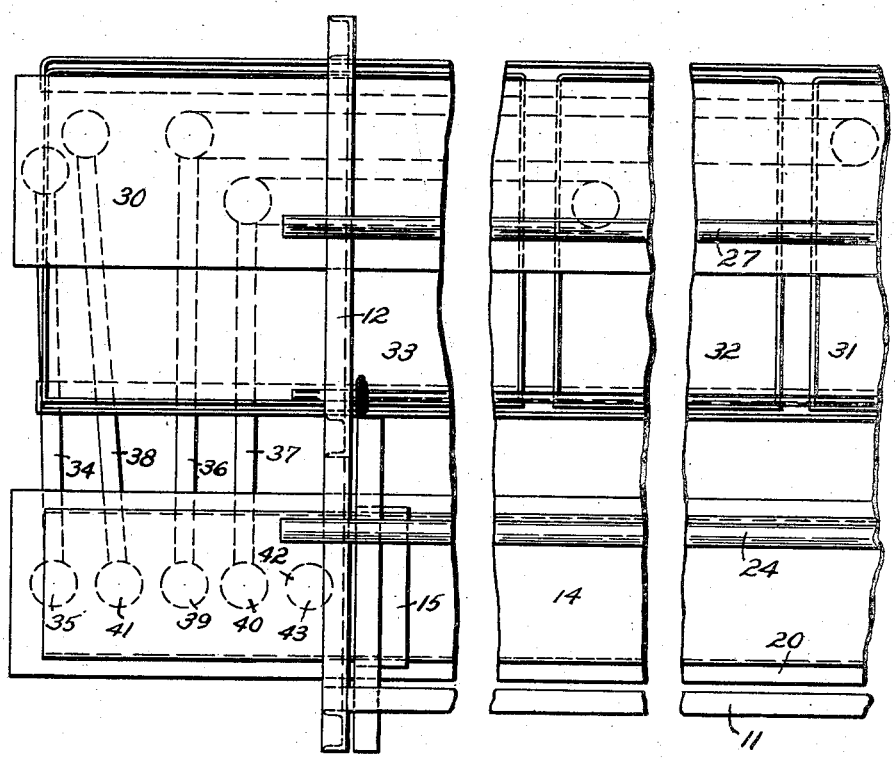
Figure 2 is a plan view, partly broken away, of the left hand end of the device showing the disposition of the pipes.

In these drawings, the frame of the device comprises vertical channel members 10, longitudinal angle members 11, upper transverse channel members 12, and lower transverse angle members 13, 13a.

14 is a cylindrical basket extending the whole length of the device and being formed of perforated sheet metal or mesh. It is rotatably mounted in bearings 15 secured to the transverse angle members 13. The basket is rotated by a motor 16 through chain and chain-wheel drive 17 and through perforated rubber bands or non-ferrous or other chains 18 which engage with radial pins 19 secured on the periphery of the basket.

20 is a trough-shaped container extending the full length of the device and having attached to its top edges yokes 21 of inverted U-shape, each having attached to its upper end a chain 22 which passes over one of a set of chain wheels 23 rigidly secured on a shaft 24 journalled in bearings 25 secured on the transverse members 12. Each of the chains 22 passes also over one of a set of chain wheels 26 secured on a shaft 27 journalled in bearings 28 also secured on the members 12. From the wheels 26 each of the chains passes downwardly and is secured at its end to a yoke 29 secured to and supporting a trough-shaped water tank 30. It will be seen that, as the water tank 30 is moved down, the container 20 will move up by a corresponding distance.

Disposed beneath the water tank 30, and below its lowest level, is a set of three longitudinally disposed stock tanks 31, 32 and 33 supported on the longitudinal angle members 11. The tank 31 contains hot soda ash, the tank 32 hot soda metasilicate and the tank 33 hydrochloric acid solution; but other chemicals may be used.

The container 20 is connected to the water tank 30 by a flexible pipe 34 through a cock 35; and the container is connected to the three tanks 31, 32 and 33 through similar pipes 36, 37 and 38 controlled respectively by cocks 39, 40 and 41. The container 20 is also provided with a drain-off pipe 42 controlled by a cock 43.

Figure 3:
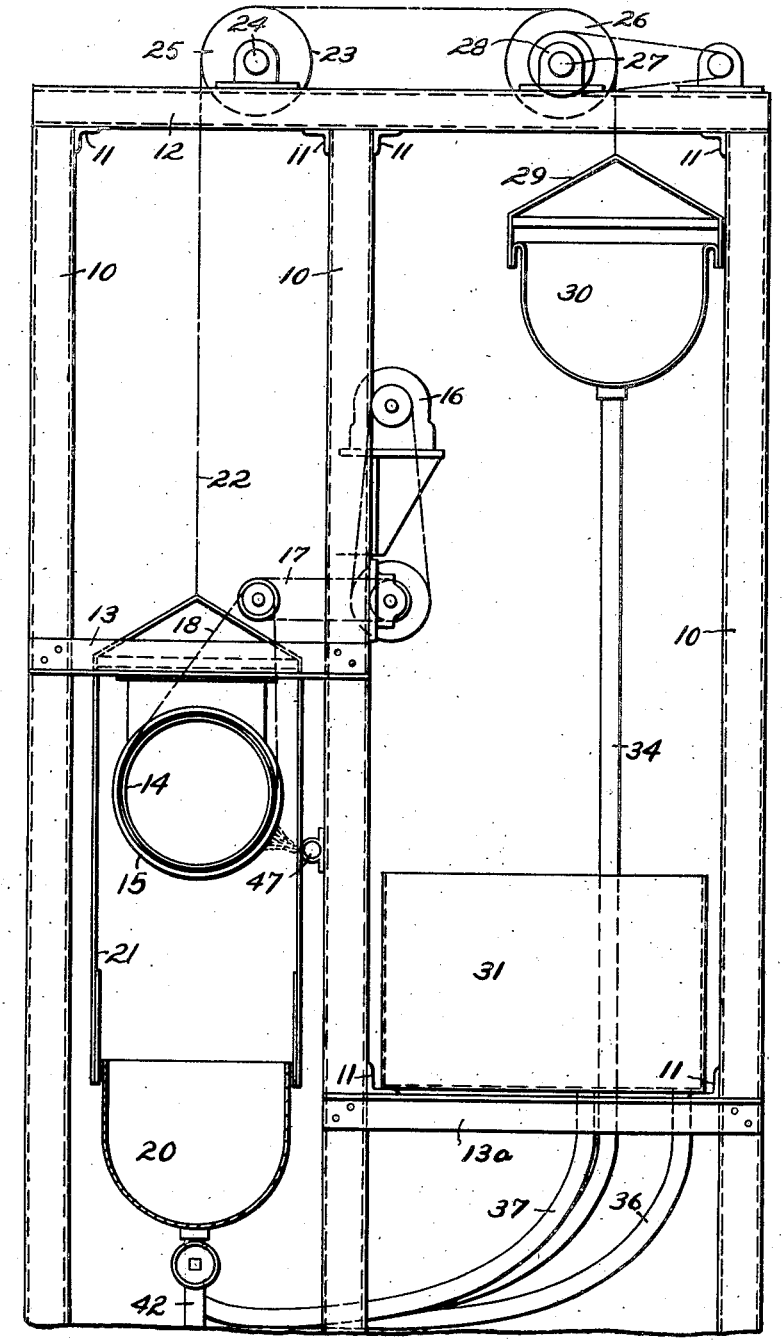
Figure 3 is an end view of the device shown in Figure 1 as seen looking in the direction of the arrow of that figure.
Figure 4:
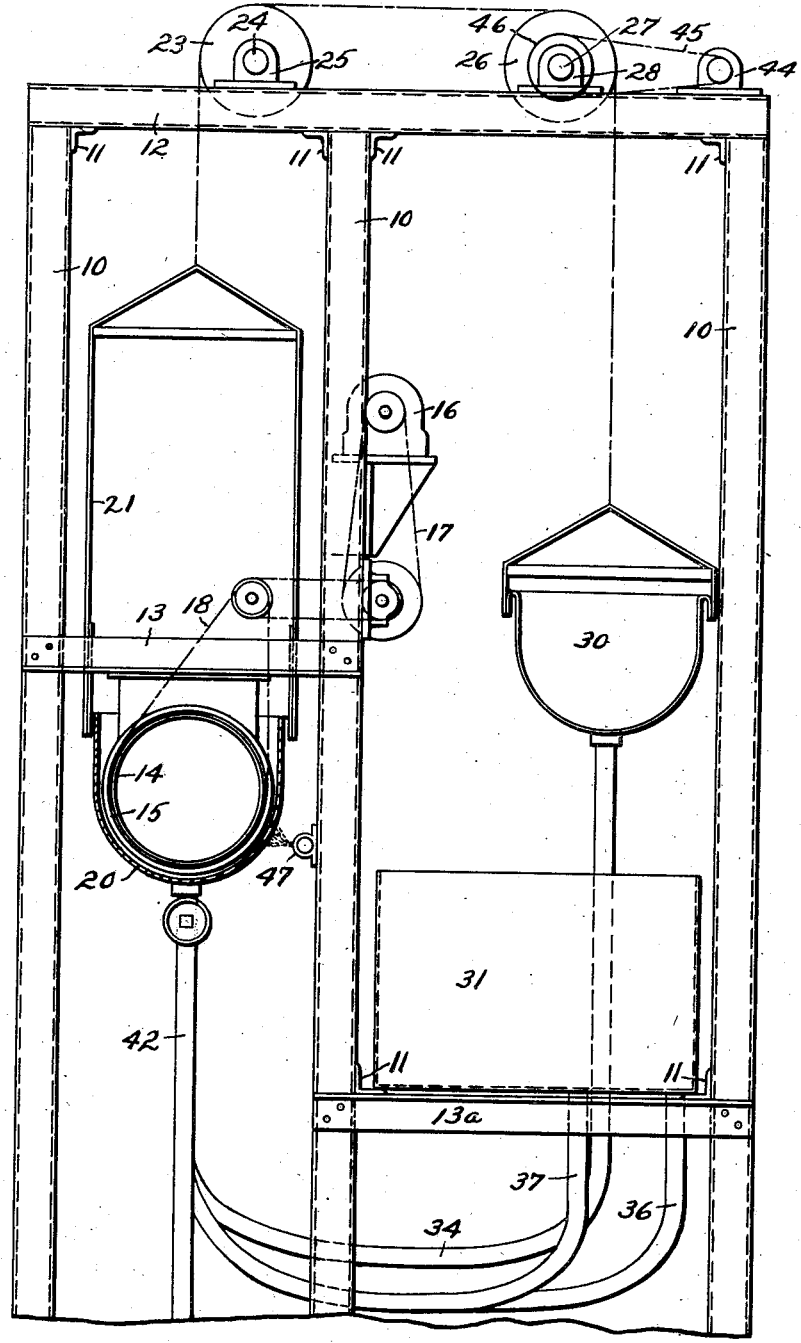
Figure 4 is a view corresponding to Figure 3 but showing the water tank in its lowered position and the liquid container in its raised position.

The action of the device is as follows:

Assuming the parts are in the position shown in Figures 1 and 3, the basket 14 is charged through one or each of its ends with the articles to be treated. If the articles are small it will be convenient to house them in separate perforated containers inserted in the basket. The basket is then continuously rotated, at a slow speed, by the motor 16. The container 20 is filled from one of the stock tanks 31, 32 or 33 (according to the treatment required) through the respective pipe and cock, the drain cock 43 being closed. The tank 30 is filled with water. It then overbalances the container 20. The tank 30 is then moved down, either by gravity or manual or other power, raising the container 20 until it completely envelopes the basket 14 as shown in Figure 4. The liquid in the container 20 then acts to process the articles in the basket after which the cock leading to the respective stock tank 31, 32 or 33 (as the case may be) is opened allowing the liquid to flow back to the respective stock tank, after which the respective cock is closed. The cock 35 is then opened allowing water to flow from the water tank 30 to the container 20 and to the articles in the basket to wash them. The cock 35 is then closed. The container 20 then overbalances the tank 30 and moves down by gravity, or by manual or other power, and the tank 30 moves up, the parts returning to the position shown in Figure 3. The cock 43 is then opened to drain off the water from the container 20.

In order to control the speed of the up-and-down movement of the liquid container and to hold them at the end of their travel a motor 44 (shown only in Figure 4) is provided coupled by a chain 45 to a chain wheel 46 on the shaft 27. The motor is controlled by switch gear to run it in either direction and stop it at the end of its run. It thus acts as a holding device as well as speed control device. Automatic switch gear for controlling a motor in the above manner is well known.

47 is a gas jet to dry the basket when the liquid container is down.

Having fully described my invention, what I claim and desire to secure by Letters Patent is:

1. Means for use in liquor-processing articles said means comprising a perforated basket, an open-topped container for holding processing liquid and placed below said basket, means for raising and lowering said container, said container, when in its fully raised position, enveloping said basket, whereby said processing liquid in said container then has access to articles in said basket, a stock tank for storing said processing liquid and being positioned above the lowest position of said container and below the highest position thereof, and means for permitting processing liquid to flow from said container, when in its highest position, into said stock tank and for permitting processing liquid to flow from said stock tank into said container when the latter is in its lowest position.

2. Means for use in liquor-processing articles said means comprising a perforated basket, means for rotating said basket, an open-topped container for holding processing liquid and placed below said basket, means for raising and lowering said container, said container when in its fully raised position, enveloping said basket whereby said processing liquid in said container then has access to articles in said basket, a flexible connector from which said container is suspended, a pulley system over which said flexible connector passes and a balance weight suspended from the other end of said flexible connector.

3. Means for use in liquor-processing articles said means comprising a perforated basket, means for rotating said basket, an open-topped container for holding processing liquid and placed below said basket, means for raising and lowering said container, said container, when in its fully raised position, enveloping said basket whereby said processing liquid in said container then has access to articles in the basket, a flexible connector from which said container is suspended, a pulley system over which said flexible connector passes and a water tank suspended from the other end of said flexible connector, a flexible pipe connecting said water tank to said container and a cock for controlling the flow through said pipe.

4. Means for use in liquor-processing articles, said means comprising a perforated basket, means for rotating said basket, an open-topped container for holding processing liquid and placed below said basket, means for raising and lowering said container, said container, when in its fully raised position, enveloping said basket whereby said processing liquid in said container then has access to articles in said basket, a stock tank for storing said processing liquid and being positioned above the lowest position of said container and below the highest position thereof, a flexible pipe connecting said stock tank with said container, and a cock controlling the flow through said pipe.

5. Means for use in liquor-processing articles said means comprising a perforated basket, means for rotating said basket, an open-topped container for holding processing liquid and placed below said basket, means for raising and lowering said container, said container, when in its fully raised position, enveloping said basket whereby said processing liquid in said container then has access to articles in said basket, a flexible connector from which said container is suspended, a pulley system over which said flexible connector passes, a water tank suspended from the other end of said flexible connector, a flexible pipe connecting said water tank to said container and a cock for controlling the flow of water through said pipe, a drain passage leading from said container and a cock for controlling the flow of water from said container.

6. Means for use in liquor-processing articles said means comprising a perforated basket, means for rotating said basket, an open-topped container for holding processing liquid and placed below said basket, means for raising and lowering said container, said container, when in its fully raised position, enveloping said basket whereby said processing liquid in said container then has access to articles in the basket, a flexible connector from which said container is suspended, a pulley system over which said flexible connector passes, a water tank suspended from the other end of said flexible connector, a flexible pipe connecting said water tank to said container, a cock for controlling the flow of water through said pipe, a stock tank for storing said processing liquid and being positioned above the lowest position of said container and below the highest position thereof, a flexible pipe connecting said stock tank with said container and a cock controlling the flow through said pipe.

7. Means for use in liquor-processing articles said means comprising a substantially horizontally disposed perforated basket, means for rotating said basket about a substantially horizontal axis, an open-topped trough-shaped container for holding processing liquid and placed below the basket, means for raising and lowering said container, said container, when in its fully raised position, enveloping said basket whereby said processing liquid in said container then has access to articles in the basket, a stock tank for storing said processing liquid and being positioned above the lowest position of said container and below the highest position thereof, and means for permitting processing liquid to flow from said container, when in its highest position, into said stock tank and for permitting processing liquid to flow from said stock tank into said container when the latter is in its lowest position.

JOHN C. MILLS.

REFERENCES CITED

The following references are of record in the file of this patent:

UNITED STATES PATENTS

| Number | Name | Date |
| --- | --- | --- |
| 403,446 | Reithoffer | May 14, 1889 |
| 1,310,662 | Kellington | July 22, 1919 |